United States Patent [19]

Boutni et al.

[11] Patent Number: 4,656,225
[45] Date of Patent: Apr. 7, 1987

[54] POLYCARBONATE RESIN BLENDS EXHIBITING IMPROVED RESISTANCE TO STRESS CRAZING AND CRACKING

[75] Inventors: Omar M. Boutni, Mt. Vernon, Ind.; Ping Y. Liu, Naperville, Ill.

[73] Assignee: General Electric Company, Mt. Vernon, Ind.

[21] Appl. No.: 812,352

[22] Filed: Dec. 23, 1985

[51] Int. Cl.$^4$ ............................................. C08L 69/00
[52] U.S. Cl. .................................... 525/67; 524/508; 525/69
[58] Field of Search .................. 525/67, 902, 69, 146, 525/148; 524/508

[56] References Cited

FOREIGN PATENT DOCUMENTS 0131188 1/1985 European Pat. Off. .

Primary Examiner—Theodore E. Pertilla
Attorney, Agent, or Firm—Myron B. Kapustij; Martin B. Barancik

[57] ABSTRACT

A resin composition exhibiting improved resistance to environmental stress crazing and cracking comprising:
  (i) a blend containing at least one aromatic carbonate resin and at least one grafted derivative of an ethylene-propylene-diene terpolymer; and
  (ii) an amount effective to improve the resistance to stress crazing and cracking of said blend of at least one multiphase acrylic interpolymer of a first elastomeric phase comprising an acrylic rubber and a rigid thermoplastic final phase.

19 Claims, No Drawings

POLYCARBONATE RESIN BLENDS EXHIBITING IMPROVED RESISTANCE TO STRESS CRAZING AND CRACKING

BACKGROUND OF THE INVENTION

The present invention relates to compositions comprising blends of resins. More particularly it relates to compositions comprising blends of aromatic polycarbonate resins, graft derivatives of ethylene-propylene-diene terpolymers, and an amount of a multiphase composite interpolymer comprising a crosslinked acrylic first stage which also contains graftlinking monomer and a final rigid thermoplastic phase which is effective to improve the resistance to environmental stress crazing and cracking of said blends.

The polycarbonates are well known commercially available materials which, due to their many advantageous properties, find use as thermoplastic engineering materials. The polycarbonates exhibit, for example, excellent properties of toughness and heat resistance.

However, the polycarbonates are generally susceptible to environmental stress crazing and cracking. Environmental stress crazing and cracking refer to the type of failure which is hastened by the presence of organic solvents such as, for example, gasoline, acetone, heptane and carbon tetrachloride when such solvents are in contact with stressed parts fabricated from aromatic polycarbonate resins. The most significant effect is a loss in impact strength and an increase in brittle type failure.

Polycarbonate resins have been blended with other thermoplastic materials such as high molecular weight polymeric glycol esters of terephthalic and/or isophthalic acid and acrylonitrile-butadiene-styrene resins (ABS resins). Mixtures of polycarbonates with ABS graft copolymers are disclosed to have improved impact properties in U.S. Pat. No. 4,172,103. However, it is disclosed in U.S. Pat. Nos. 3,130,177 and 3,825,292 that the impact resistance of polycarbonate resins tends to be lowered when they are blended with ABS resins.

Thus, the blending art, particularly when dealing with polycarbonates, is a generally complex and somewhat unpredictable area where the empirical approach is still generally the rule rather than the exception. Thus, in order to provide useful binary blends of a polycarbonate resin with another resin, the two resins must be compatible to a certain degree, combinable over certain useful concentrations, and the blends should exhibit a combination of the various advantageous properties of the resins rather than the individual properties of the neat resins. The formulation of blends containing three or more different resins is fraught with a much higher degree of complexity and unpredictability.

Grafted derivatives of ethylene-propylenediene terpolymers and compositions of such polymers with other resins are known in the art and are described in the patent literature. It has been disclosed, for example, that olefinic copolymers and terpolymers can be grafted with styrene, acrylo-nitrile-styrene, methyl methacrylate, styrene-methyl methacrylate, and the like, to provide thermoplastics which can be further blended, e.g., with styrene-acrylonitrile, and molded, extruded, or vacuum formed into articles having good tensile and impact strengths.

Polymers of this type and methods for their preparation are described in U.S. Pat. Nos. 4,202,948 and 4,166,081, the former being incorporated by reference.

Thermoplastic resin blends of polysulfone resins and graft derivatives of ethylene-propylene-diene terpolymers are disclosed in U.S. Pat. No. 3,641,207 to have good processability and impact resistance over relatively narrow concentration ranges.

Aromatic polycarbonate resins and grafted derivatives of ethylene-propylene-diene terpolymers are combinable with each other over a wide range of concentrations and provide compositions which exhibit advantageous properties after molding. Such properties are obtainable over a wide range of compositions. Especially noteworthy properties are high gloss on the surface of articles molded from these compositions and improved resistance to environmental stress crazing and cracking as compared with aromatic polycarbonate resins.

While these blends of polycarbonate resin and graft derivatives of ethylene-propylene diene terpolymers are useful in a wide variety of applications there exist certain situations which require better resistance to environmental stress crazing and cracking than possessed by these blends. It is, therefore, an object of the instant invention to provide compositions containing blends of polycarbonate/grafted derivative of ethylene-propylene-diene terpolymer which possess improved resistance to environmental stress crazing and cracking.

SUMMARY OF THE INVENTION

The instant invention is directed to a resinous composition exhibiting improved resistance to organic solvents comprising:

(i) a blend of an aromatic carbonate resin and a graft derivative of ethylene-propylene-diene terpolymer; and (ii) an amount at least effective to improve the resistance to organic solvents of said blend of at least one multiphase composite interpolymer comprising a crosslinked acrylic first stage which also contains graftlinking monomer and a final rigid thermoplastic phase.

DESCRIPTION OF THE INVENTION

It has been discovered that compositions of polycarbonates and grafted derivatives of ethylene-propylene-diene terpolymers can be provided which exhibit improved resistance to environmental stress crazing and cracking relative to the binary blends of polycarbonate/grafted derivatives of ethylene-propylene-diene terpolymer.

According to the present invention there are provided compositions exhibiting improved resistance to environmental stress crazing and cracking comprising, in admixture:

(i) a blend containing at least one aromatic carbonate resin and at least one graft derivative of an ethylene-propylene-diene terpolymer; and (ii) an amount effective to improve the resistance to environmental stress crazing and cracking of said blend of at least one multiphase composite interpolymer comprising a crosslinked acrylic first stage which also contains graftlinking monomer and a final rigid thermoplastic phase.

The high molecular weight aromatic polycarbonate resins utilized in the blends (i) are well known in the art and are amply described in the patent literature. These polycarbonates, along with methods for their preparation, are described in U.S. Pat. Nos. 3,161,615, 3,220,973, 3,312,660, 3,312,659, 3,313,777, 3,666,614 and 3,393,672, all of which are incorporated by reference.

These polycarbonates contain at least the following recurring structural unit:

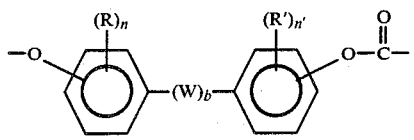   I.

wherein:

R and R' are independently selected from monovalent hydrocarbon radicals, monovalent hydrocarbonoxy radicals, and halogen radicals;

W is selected from divalent hydrocarbon radicals,

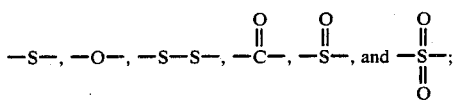

n and n' are independently selected from integers having a value of from 0 to 4 inclusive; and b is either zero or one.

The monovalent hydrocarbon radicals represented by R and R' include alkyl, cycloalkyl, aryl, aralkyl, and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl and biphenyl. The preferred aralkyl and alkaryl radicals are those containing from 7 to about 14 carbon atoms.

The monovalent hydrocarbonoxy radicals represented by R and R' may be represented by the general formula —OR$^1$ wherein R$^1$ is a monovalent hydrocarbon radical of the type described hereinafore. Preferred hydrocarbonoxy radicals are the alkoxy and aryloxy radicals.

The preferred halogen radicals represented by R and R' are chlorine and bromine.

The divalent hydrocarbon radicals represented by W include the alkylene radicals, the alkylidene radicals, the cycloalkylene radicals, and the cycloalkylidene radicals. Preferred alkylene radicals are those containing from 2 to about 30 carbon atoms. Preferred alkylidene radicals are those containing from 1 to about 30 carbon atoms. Preferred cycloalkylene and cycloalkylidene radicals are those containing from 6 to about 16 ring carbon atoms. These polycarbonates may be conveniently prepared by the reaction of a dihydric phenol with a carbonate precursor. Typically, the dihydric phenols used may be represented by the formula

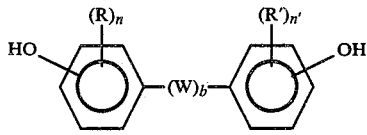   II.

wherein R, R', W, n, n' and b are as defined hereinafore.

Some illustrative non-limiting examples of these dihydric phenols include:
2,2-bis(4-hydroxyphenyl)propane (bisphenol-A);
bis(4-hydroxyphenyl)methane;
2,2-bis(3,5-dimethyl-4-hydroxyphenyl)propane;
1,1-bis(4-hydroxyphenyl)decane;
2,2-bis(3,5-dibromo-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)cyclododecane;
4,4'-thiodiphenol; and
bis(4-hydroxyphenyl)ether.

Other dihydric phenols are also available and are disclosed, inter alia, in U.S. Pat. Nos. 2,999,835, 3,028,365, 3,334,154 and 4,131,575, all of which are incorporated herein by reference.

It is, of course, possible to employ a mixture of two or more different dihydric phenols as well as individual dihydric phenols in the preparation of the instant polycarbonates.

Preferred polycarbonates of Formula I are the para,-para-polycarbonates, i.e., polycarbonates containing at least the following recurring structural unit:

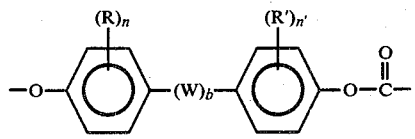   Ia.

wherein R, R', W, n, n' and b are as defined hereinafore. Particularly useful polycarbonates of this type are those wherein b is one and W is selected from divalent hydrocarbon radicals of the type described hereinafore.

The carbonate precursor employed may be a carbonyl halide, a carbonate ester, or a bishaloformate. The carbonyl halides are carbonyl bromide, carbonyl chloride, and mixtures thereof. Typical of the carbonate esters are diphenyl carbonate; di(halophenyl) carbonates such as di(chlorophenyl)carbonate and di(bromophenyl)carbonate; di(alkylphenyl)carbonates such as di(tolyl)carbonate; and di(naphthyl)carbonate.

The bishaloformates include the bishaloformates of dihydric phenols such as bisphenol-A and hydroquinone; bishaloformates of glycols such as ethylene glycol, neopentyl glycol, and polyethylene glycol; and the like.

These polycarbonates may be prepared by well known conventional processes such as the interfacial polymerization process, transesterification, and melt polymerization. Some of these processes are described, inter alia, in U.S. Pat. Nos. 4,018,750, 4,123,436 and 3,153,008, all of which are incorporated herein by reference.

Included within the scope of the term polycarbonate are the randomly branched aromatic thermoplastic polycarbonates. These randomly branched polycarbonates may be conveniently prepared by the reaction of a dihydric phenol, a carbonate precursor, and a minor amount of a branching agent. The branching agents are well known in the art and are generally polyfunctional aromatic compounds which contain at least three functional groups which may be hydroxyl, carboxyl, carboxylic anhydride, haloformyl, or mixtures thereof. Some of these polyfunctional compounds are disclosed in U.S. Pat. Nos. 3,525,712, 3,541,049, 3,544,514, 3,635,895, 3,816,373, 4,001,184, 4,202,047 and 4,194,953, all of which are incorporated herein by reference.

Also included within the scope of the instant invention are the copolyester-carbonates. These copolyester-carbonates, as well as methods for their preparation, are well known in the art and are described, inter alia, in U.S. Pat. Nos. 3,169,121, 4,465,820, 4,194,038 and 4,156,069, all of which are incorporated herein by reference. These copolyester-carbonates contain recurring carbonate groups, carboxylate groups, and aromatic carbocyclic groups in the linear polymer chain in which at least some of the carbonate groups and at least some of the carboxylate groups are bonded directly to the ring carbon atoms of the aromatic carbocyclic groups.

These copolyester-carbonates contain ester bonds and carbonate bonds in the polymer chain, wherein the amount of ester bonds is in the range of from about 25 to about 90 mole percent, preferably from about 35 to about 80 mole percent. Thus, for example, 5 moles of bisphenol-A reacting completely with 4 moles of isophthaloyl dichloride and one mole of phosgene would give a copolyester-carbonate containing 80 mole percent ester bonds.

The copolyester-carbonates of the instant invention may be conveniently prepared by the reaction of at least one dihydric phenol, a carbonate precursor, and at least one ester precursor. The ester precursor may be, without limitation, a difunctional carboxylic acid, preferably an aromatic difunctional carboxylic acid, or an ester forming reactive derivative thereof. Some useful difunctional aromatic carboxylic acids include isophthalic acid, terephthalic acid, and mixtures thereof. Instead of using the difunctional carboxylic acids it is preferred to use their ester forming reactive derivatives such as, for example, the acid dihalides. Thus, for example, instead of using isophthalic acid, terephthalic acid, or mixtures thereof it is preferred to employ isophthaloyl dichloride, terephthaloyl dichloride, or mixtures thereof.

The grafted derivatives of ethylene-propylene diene terpolymers which form the second component of the blends (i) are well known in the art and are generally commercially available, e.g., under the trade designation ROVEL ® from Uniroyal Inc. (newly acquired by the Dow Chemical Co.), or may be readily prepared by known methods. These resins may be characterized as being an ethylene-propylene-nonconjugated diene interpolymer grafted with the homopolymer or copolymer of monoethylenically unsaturated monomers as disclosed in U.S. Pat. No. 4,202,948, for example, styrene, styrene-acrylonitrile, methyl methacrylate or styrene-methyl methacrylate, halostyrenes, alpha methylstyrene, p-methylstyrene acrylonitrile, methacrylonitrile, acrylic acid, methacrylic acid, the lower alkyl esters of acrylic acid and methacrylic acid, styrene maleic anhydride, and the like.

More particularly, the second component of the blends (i) is a resinous composition of (A) polymerized alkenyl aromatic units and/or (B) polymerized acrylic units, in combination with (C) a rubbery terpolymer comprising copolymerized units of ethylene and propylene and a non-conjugated diolefin. Preferably this second component of (i) is a graft copolymer produced by polymerizing the resin forming alkenyl aromatic monomer and the acrylic monomer in the presence of a rubbery terpolymer of ethylene, propylene and a non-conjugated diolefin.

The non-conjugated dienes used in the preparation of the terpolymer elastomers may include open chain non-conjugated dienes such as 1,4-hexadiene and also cyclic (especially bridged ring) non-conjugated dienes such as dicyclopentadiene, 5-methylene-2-norbornene, 5-ethylidene-2-norbornene, and 1,4-cyclooctadiene. The respective weight ratios of ethylene to propylene in the elastomers may range from 40:60 to 75:25. The content of the additional monomer, such as the non-conjugated diene, in the terpolymer can range from about 1% to about 20% by weight. The preferred diene is 5-ethylidene-2-norbornene.

Methods for the preparation of the foregoing rubbery terpolymers are described in U.S. Pat. Nos. 2,933,480, 3,000,866 and 3,000,867.

The resin forming monomers useful for copolymerization with the aforedescribed rubbery copolymers and terpolymers include styrene, alpha-methylstyrene, p-methylstyrene and other alkyl substituted styrenes and acrylics such as acrylonitrile, acrylates and alkacrylates. The ester portion of the acrylate is generally alkyl from one to about 8 carbon atoms inclusive, preferably from one to about 6 carbon atoms inclusive. The "alk" portion of the "alkacrylate" is alkyl of one to three carbon atoms, inclusive. Examples of acrylates and alkacrylates include ethyl acrylate, n-butyl acrylate, 2-ethylhexyl acrylate, methyl methacrylate, propylethyl acrylate and isopentylpropacrylate. Mixtures of styrenics and acrylates can also be employed. Especially preferred are mixtures of styrene and acrylonitrile.

As explained hereinafore the graft copolymers are prepared by polymerizing the resin forming monomers, e.g., styrene and acrylonitrile, in the presence of rubbery terpolymer, e.g., ethylene-propylenediene. In one procedure the rubbery terpolymer is dissolved in an inert organic solvent, e.g., benzene, to form a cement, to which is added the desired amount of the resin forming monomers and a radical initiator, e.g., peroxide. The mixture is heated to decompose the initiator and to polymerize the monomers. The graft copolymer which results is isolated, e.g., by precipitation with an antisolvent such as methanol.

The evidence indicates that at least a portion of the resin grafts onto the rubber to form a graft copolymer made up of a rubbery spine or backbone polymer and resinous side chains.

The proportion of resin forming monomers to rubber used in the graft polymerization can vary, for instance, from 1:4 to 4:1, on a weight basis.

The graft copolymers and methods for their preparation are described in greater detail by F. X. O'Shea in U.S. Pat. No. 3,642,950 and by Albert Fournier, Jr and Charles Paddock in U.S. Pat. No. 4,166,081, both of which are incorporated herein by reference.

Since the carbonate resins and the grafted derivatives of ethylene-propylene-diene terpolymers are compatible in widely variant proportions the blends (i) can contain wide ranges of these two resins, for example, from 5 to 95 parts by weight of the carbonate resin and from 95 to 5 parts by weight of said grafted derivative per 100 parts by weight of said carbonate resin and said grafted derivative combined with the particular amount being dependent on specific requirements. A particularly useful ratio is from 60 to about 95 parts by weight of carbonate resin and from about 5 to about 40 parts by weight of said grafted derivative of ethylenepropylenediene terpolymer.

Component (ii) of the instant compositions is a multiphase composite interpolymer comprising a crosslinked acrylic first stage which also contains graftlinking monomer and a final rigid thermoplastic phase. These multiphase composite interpolymers are well known in the art and are generally commercially available, e.g., KM-330 from Rohm and Haas Company, or may be readily prepared by known methods. These types of multiphase composite interpolymers, along with methods for their preparation, are described in U.S. Pat. No. 4,096,202, to Farnham, which is incorporated herein by reference. These multiphase composite acrylic interpolymers of a first elastomeric phase and a rigid thermoplastic final phase may be referred to as being of the "coreshell" type, comprising a cross-linked alkyl acrylate rubber core and an alkyl methacrylate outer shell.

More specifically, such interpolymers comprise a first elastomeric phase which has been prepared by polymerizing a mixture of a major amount of a $C_1$-$C_6$ alkyl acrylate and a minor amount of cross-linking monomer and a graft-linking monomer, and a final rigid thermoplastic phase which has been polymerized in the presence of the elastomeric phase.

Preferably the interpolymer comprises from about 25 to about 95 percent by weight of the elastomeric phase, and from about 75 to about 5 weight percent of the rigid thermoplastic phase; and, moreover, the elastomeric phase has been polymerized from a monomer system comprising from about 75 to about 99.8 percent by weight of a $C_1$-$C_6$ alkyl acrylate, from about 0.1 to about 5 weight percent of a cross-linking monomer, and from about 0.1 to about 5 percent by weight of a graft-linking monomer.

Useful as crosslinking monomers are polyacrylic and polymethacrylic esters of polyols, such as butylene diacrylate, butylene dimethacrylate, trimethylol propane trimethacrylate, and the like; di- and trimethyl benzene, vinyl acrylate and vinyl methacrylate. The preferred crosslinking monomer is butylene diacrylate.

The graft-linking monomer is a polyethylenically unsaturated compound having a plurality of addition polymerizable reactive groups or "sites", at least one of which polymerizes at substantially different rates from one or more of the other reactive groups. The function of this component is to provide a residual level of unsaturation in the elastomeric phase, and especially during the later stages of polymerization. Examples of such graft linking monomers are allylic compounds such as allyl esters of ethylenically unsaturated acids, including allyl acrylate, allyl methacrylate, diallyl maleate, diallyl fumarate, diallyl itaconate, allyl acid maleate, allyl acid fumarate, and allyl acid itaconate. Preferred are allyl methacrylate and diallyl maleate.

An especially preferred interpolymer is comprised of a first stage comprising an elastomeric polymer which has been polymerized from a monomer mixture of 95 to 99.8 percent by weight of butyl acrylate, 0.1 to 2.5 percent by weight of butylene diacrylate cross-linking agent, and 0.1 to 2.5 percent by weight of allyl methacrylate or diallyl maleate graft-linking agent, and a final (outer) stage which has been polymerized from methyl methacrylate.

The aforementioned interpolymers can be prepared by procedures described in the patent literature, for instance, in the above-identified Franham et al. patent. A commercially available material useful in this invention is ACRYLOID ® KM 330 from Rohm and Haas Company.

The amount of component (ii) present in the instant compositions is an amount which is effective to improve or positively upgrade the resistance to environmental stress crazing and cracking, i.e., the resistance to organic solvents, of blends (i). Generally, this amount is at least about 1 weight percent, preferably at least about 2 weight percent, and more preferably at least about 3 weight percent. The upper limit of component (ii) is an amount which is insufficient to substantially alter or substantially deleteriously affect, to a substantial degree, substantially most of the advantageous properties of blend (i). Generally an amount of about 25 weight percent should not be exceeded, preferably an amount of about 20 weight percent, and most preferably an amount of about 15 weight percent. Weight percent of component (ii) is measured as the amount of (ii) present in the total amounts of (i) and (ii) in the composition, i.e., the total amounts of (ii), carbonate polymer, and grafted derivative of ethylene-propylene-diene terpolymer present in the composition.

In a preferred embodiment the instant compositions contain no glass such as, for example, glass fibers. In this embodiment blend (i) contains either a polycarbonate resin or a copolyester-carbonate resin, i.e., it does not contain a mixture of polycarbonate and copolyester-carbonate resins.

The instant compositions may be readily prepared by physically admixing the various components together. Thus, for example, the instant compositions may be prepared by first forming blend (i) by admixing together the carbonate polymer and the graft derivative of ethylene-propylenediene terpolymer, and then mixing this blend with the desired amount of component (ii). Alternately, a composition of the instant invention may be prepared by mixing together a carbonate resin, a graft derivative of ethylene-propylene-diene terpolymer, and component (ii).

The compositions of the instant invention may be used to form molded, extruded or vacuum formed parts. These compositions are particularly useful for the production of molded parts having glossy surfaces and improved resistance ot organic solvents.

The compositions of the instant invention may optionally contain the various well known additives such as, for example, antioxidants; antistatic agents; mold release agents; hydrolytic syabilizers such as the epoxides; color stabilizers such as the organophosphites; colorants; ultraviolet radiation stabilizers such as the benzophenones, benzotriazoles, cyanoacrylates, and benzylidene malonates; and flamc retardants.

The flame retardants which may be used include the alkali and alkaline earth metal salts of organic sulfonic acids. These salts are disclosed, inter alia, in U.S. Pat. Nos. 3,933,734, 3,948,851, 3,926,908, 3,919,167, 3,909,490, 3,953,397, 3,931,100, 3,978,024, 3,953,399, 3,917,559, 3,951,810, 3,940,366, 3,775,367 and 3,836,490, all of which are incorporated by reference.

Conventional well known flame retardants other than the above salts may be employed either alone or in combination with said salts. These conventional flame retardant additives generally contain a halogen, preferably chlorine and/or bromine. That is to say, they are a halogen source. They may be inorganic or organic, with the organic halogen sources being preferred. Typical of the inorganic halogen sources are NaCl, KBr, KCl, etc. The organic halogen sources are preferably aromatic and may be either monomers or polymers. Typical aromatic monomers include the halodiphenyl ethers such as tetrabromodiphenyl ether, etc. Typical aromatic polymers include those derived from halogenated dihydric phenols such as, for example, a polycarbonate derived from tetrabromobisphenol-A or a carbonate copolymer derived from bisphenol-A and tetrabromobisphenol-A. The flame retardant additives are present in the instant compositions in flame retardant amounts, i.e., amounts which are effective to render the instant compositions flame retardant.

DESCRIPTION OF THE PREFERRED EMBODIMENT

In order that those skilled in the art may better understand how the present invention may be practiced the following examples are given by way of illustration and not by way of limitation. In the examples all parts and percentages are parts and percentages by weight unless otherwise specified.

The following examples illustrate compositions falling outside the scope of the instant invention. They are presented for comparative purposes only.

EXAMPLE 1

This example illustrates a blend of an aromatic polycarbonate resin and a graft copolymer of styrene-acrylonitrile on an ethylene-propylene-5-ethylidene-2-norbornene terpolymer.

A composition is prepared by tumble mixing 20 parts by weight of a graft copolymer of styrene-acrylonitrile on an ethylene-propylene-5-ethylidene-2-norbornene (ROVEL ® 401) with 80 parts by weight of an aromatic polycarbonate resin derived from bisphenol-A and phosgene (LEXAN ® resin from General Electric Company). The resulting blend is extruded at 255° C. and injection molded at 260° C. into test specimens measuring 63.5 mm × 12.7 mm × 3.2 mm thick.

The notched Izod impact strength of some of these test specimens is determined in accordance with ASTM D256 and the results are set forth in Table I. Additionally, some of the test specimens are mounted on a stress jig (0.7% strain at 14.1 kgf/cm$^2$) and soaked at room temperature for two hours in AMOCO unleaded premium gasoline. These specimens are then removed from the jig, the gasoline is allowed to evaporate off at room temperature for 24 hours, and the specimens are then subjected to the notched Izod impact strength test. The results are set forth in Table I.

EXAMPLE 2

This example illustrates a blend of polycarbonate resin and an acrylic interpolymer.

A composition is prepared by tumble mixing 96 parts by weight of the polycarbonate resin of Example 1 with 4 parts by weight of acrylic interpolymer (ACRYLOID ® KM 330). Test specimens are prepared substantially in accordance with the procedure of Example 1 and are subjected to the notched Izod impact strength test, both before and after soaking in gasoline. The results are set forth in Table I.

The following examples illustrate the compositions of the instant invention.

EXAMPLE 3

A composition is prepared by tumble mixing 91 parts by weight of the polycarbonate resin of Example 1, 5 parts by weight of the graft derivative of Example 1, and 4 parts by weight of the acrylic interpolymer of Example 2. Test specimens are prepared substantially in accordance with the procedure of Example 1 and are subjected to the Notched Izod impact strength test, both before and after soaking in gasoline. The results are set forth in Table I.

EXAMPLE 4

A composition is prepared by tumble mixing 86 parts by weight of the polycarbonate resin of Example 1, 10 parts by weight of the graft derivative of Example 1, and 4 parts by weight of the acrylic interpolymer of Example 2. Test specimens are prepared substantially in accordance with the procedure of Example 1 and are subjected to the Notched Izod impact strength test, both before and after soaking in gasoline. The results are set forth in Table I.

EXAMPLE 5

A composition is prepared by tumble mixing 80 parts by weight of the polycarbonate resin of Example 1, 10 parts by weight of the graft derivative of Example 1, and 10 parts by weight of the acrylic interpolymer of Example 2. Test specimens are prepared substantially in accordance with the procedure of Example 1 and are subjected to the Notched Izod impact strength test both before and after exposure to gasoline. The results are set forth in Table I.

TABLE I

| Example No. | Parts by Weight | | | Notched Izod (kgf cm/cm) | |
| --- | --- | --- | --- | --- | --- |
| | acrylic interpolymer | polycarbonate | graft derivative | before soaking in gasoline | after soaking in gasoline |
| 1 | 0 | 80 | 20 | 89.0$^{100*}$ | 8.1$^0$ |
| 2 | 4 | 96 | 0 | 76.0$^{100}$ | 4.9$^0$ |
| 3 | 4 | 91 | 5 | 86.9$^{100}$ | 15.2$^{100}$ |
| 4 | 4 | 86 | 10 | 86.9$^{100}$ | 17.9$^{100}$ |
| 5 | 10 | 80 | 10 | 81.4$^{100}$ | 53.7$^{100}$ |

*The superscripts indicate the % ductile break, 100% indicating 100% ductile break and 0% indicating a brittle break.

As illustrated by the data in Table I the compositions of the instant invention (Examples 3–5) exhibit better resistance to environmental stress crazing and cracking than either the composition which contains no acrylic interpolymer (Example 1) or the composition which contains no graft derivative of ethylene-propylene-diene terpolymer (Example 2). Furthermore, the compositions of the instant invention are ductile after exposure to gasoline. This is in sharp contrast to the compositions of Examples 1 and 2 which become brittle after exosure to gasoline.

Obviously, other modifications and variations of the invention, as described above, are possible in light of the instant disclosure. It is to be understood, therefore, that changes can be made in the particular embodiments shown without departing from the scope of the invention as defined in the appended claims.

What is claimed is:

1. A resin composition exhibiting improved resistance to environmental stress crazing and cracking comprising:
   (i) a blend containing at least one aromatic carbonate resin and at least one ethylene-propylene-non-conjugated-diene interpolymer grafted with the homopolymer or copolymer of monoethylenically unsaturated monomers having a phenyl, carbonyl or cyano group attached to a vinylic carbon atom; and
   (ii) an amount effective to improve the resistance to environmental stress crazing and cracking of said blend of at least one multiphase interpolymer of a first elastomeric phase comprising an acrylic rubber and a rigid thermoplastic final phase.

2. The composition of claim 1 wherein (ii) is a multiphase polymer comprised of a first stage comprising an elastomeric polymer which has been polymerized from a monomer mixture of 95 to 99.8 parts by weight of butyl acrylate, 0.1 to 2.5 parts by weight of butylene diacrylate and 0.1 to 2.5 parts by weight of allyl methacrylate or diallyl maleate per 100 parts by weight of said first stage, and a final stage which has been polymerized from methyl methacrylate.

3. The composition of claim 1 wherein said ethylene-propylene-non-conjugated-diene interpolymer grafted with the homopolymer or copolymer of monoethylencially unsaturated monomers having a phenyl, carbonyl or cyano group attached to a vinylic carbon atom is a graft polymer of styrene-acrylonitrile on an ethylene-propylene-5-ethylidene-2-norbornene.

4. The composition of claim 1 wherein said carbonate resin is a polycarbonate resin.

5. The composition of claim 4 wherein said polycarbonate resin contains at least one recurring structural unit represented by the formula

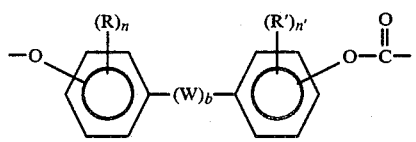

wherein
R and R' are independently selected from monovalent hydrocarbon radicals, monovalent hydrocarbonoxy radicals, or halogen radicals,
W is selected from divalent hydrocarbon radicals,

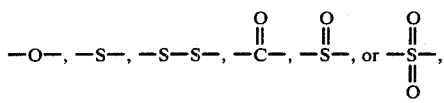

n and n' are independently selected from integers having a value of from 0 to 4 inclusive, and
b is either zero or one.

6. The composition of claim 5 wherein b is one.

7. The composition of claim 6 wherein W is a divalent hydrocarbon radical.

8. The composition of claim 7 wherein said divalent hydrocarbon radical is an alkylidene radical.

9. The composition of claim 8 wherein said alkylidene radical is 2,2-propylidene.

10. The composition of claim 9 wherein n amd n' are zero.

11. The composition of claim 1 wherein said carbonate resin is a copolyester-carbonate resin.

12. The composition of claim 11 wherein said copolyester-carbonate resin contains the reaction products of at least one dihydric phenol, at least one ester precursor, and a carbonate precursor.

13. The composition of claim 12 wherein said carbonate precursor is phosgene.

14. The composition of claim 13 wherein said ester precursor is selected from isophthaloyl dihalide, terephthaloyl dihalide, or mixtures thereof.

15. The composition of claim 13 wherein said dihydric phenol is bisphenol-A.

16. The composition of claim 1 which contains at least about 1 weight percent of (ii), based on the total amounts of (i) and (ii) present.

17. The composition of claim 15 which contains at least about 2 weight percent of (ii).

18. The composition of claim 16 which contains at least about 3 weight percent of (ii).

19. The composition of claim 1 which contains a flame retardant amount of at least one flame retardant compound.

* * * * *